Patented Apr. 7, 1953

2,634,249

UNITED STATES PATENT OFFICE 2,634,249

KETONE - ALDEHYDE - PHENOL - ALDEHYDE POTENTIALLY REACTIVE RESINOUS COMPOSITION

George Karl Vogelsang, La Mott, Pa., assignor to The Borden Company, New York, N. Y., a corporation of New Jersey No Drawing. Application July 22, 1948,
Serial No. 40,165

12 Claims. (Cl. 260—43)

The present invention relates to a new and novel class of potentially reactive resinous compositions possessing resinoid characteristics. The resinoids of the present invention are prepared by subjecting mixtures of selected ketone-aldehyde and potentially reactive phenol-aldehyde condensation products to conditions of controlled resinification. The present invention represents a substantial improvement over the art as disclosed in application Serial No. 30,733, filed June 3, 1948, and entitled "Potentially Reactive Compositions Possessing Resinoid Characteristics."

The object of the present invention is to provide a new class of potentially reactive compositions which is convertible to the infusible, insoluble and thermo-rigid resinous state.

The complex chemistry of the component condensation products utilized in the pursuit of the present invention is currently too imperfectly understood to permit of assigning characteristic structural formulas to these materials. Consequently, in defining these condensation products it is necessary to characterize them in terms of their known inherent physical and chemical attributes. In this manner it is feasible to differentiate between the usable condensation products from all other types.

Of the almost infinite variety of condensation products that may be prepared by reacting a ketone with an aldehyde only a handful is suitable for use in the present invention. Only methyl ketones are suitable for the preparation of the requisite condensation products. Further, as the number of carbon atoms in the methyl ketone increases, its reactivity with aldehydes diminishes and the resultant condensation products become less and less suitable for the purposes of the present invention. When the radical combined to the methyl ketone complex contains more than four carbon atoms, it does not appear to be feasible to produce suitable condensation products. To be suitable, the ketone-aldehyde condensation product must be derived from a methyl ketone having the general formula $CH_3—CO—R'$, wherein $R'$ represents an aliphatic radical having from one to four carbon atoms.

Only aliphatic aldehydes containing five or fewer carbon atoms lend themselves toward the production of suitable ketone-aldehyde condensation products. Accordingly, the only ketone-aldehyde condensation products suitable for use in the present invention are those derived from aldehydes having the general formula $R''—CHO$, wherein $R''$ represents a member selected from the group consisting of hydrogen and aliphatic radicals having from one to four carbon atoms.

Not all condensation products derived from the reaction between the above-defined ketones and aldehydes are suitable for use in the present invention. To be suitable, the ketone-aldehyde condensation products must simultaneously be fusible, soluble, substantially non-resinous, substantially non-volatile, and reactive.

By the term "soluble" I mean that the condensation products must be soluble in one or more of the following compounds or mixtures thereof: water, aqueous acid solution, aqueous alkaline solution, methanol, ethanol, butanol, acetone, ethyl methyl ketone, methyl isobutyl ketone, methyl acetate, ethyl acetate, butyl acetate, dioxane, formamide, acetamide, methyl ether of ethylene glycol, ethylene glycol, ethyl hexane diol, concentrated formic acid, glacial acetic acid, furfural, tetra hydro furfural, tetra hydro furfuryl alcohol, phenol, cresol, 37% aqueous formaldehyde, ethylene chlorhydrin, propylene chlorhydrin, ethyl amine, ethylene diamine, monoethanolamine, diethanolamine, amino ethyl ethanol amine, morpholine, thiodiglycol, etc.

While on the subject of "solubility" it should be pointed out that the phenol-aldehyde condensation products to be described later, as well as the potentially reactive compositions of the present invention (prior to cure) are also "soluble" in the sense that they will dissolve in one or more of the above compounds or mixtures thereof.

To be suitable for use in the present invention the ketone-aldehyde condensation products must be substantially non-resinous. In this connection it should be pointed out that many ketone-aldehyde condensation products are "resinous" in appearance only and that when subjected to rigorous analysis the products can be shown to be non-resinous by (1) a determination of their low molecular weight (products of low molecular weight are non-resinous); (2) through a showing that the compound, after the necessary purification, even though substantially "non-volatile" can be distilled under appropriate conditions (in general, resins cannot be distilled without decomposition), or (3) that the material, as such or in the form of a simple derivative, can be crystallized (resins, as such, or their simple derivative, cannot be crystallized in the ordinary sense). Most ketone-aldehyde condensation products are possessed of a complex composition, comprising a variety of related materials. In some instances there may be a very small quantity of resinous by-product material whose presence, in view of the small quantity in which it may be present, is not unduly objectionable, but if a substantial quantity of resinous material be present, the condensation product containing it cannot be used in the present process.

The ketone-aldehyde condensation products suitable for use in the present invention are, per se, not appreciably volatile and, owing to their heat-sensitive nature, cannot, in general, be distilled in ordinary equipment at atmospheric pressure without decomposition. The substantially non-volatile products may, however, be distilled unchanged via the use of special high vacuum equipment (e. g., as in a molecular still). In other instances, the substantially non-volatile products may first be acylated and the resultant esters may then be distilled at elevated temperatures in appropriate equipment. In this connection it is emphasized that the fact that the usable ketone-aldehyde condensation products are "substantially non-volatile" should not be taken to mean that they are "non-distillable." To all intents and purposes the ketone-aldehyde condensation products suitable for use may be referred to as being "substantially non-volatile." This restriction to the use of the ketone-aldehyde condensation products which are "substantially non-volatile" serves to exclude the readily volatile condensation products (such as 3-keto-butanol), which substances are either inoperative in the present process or lead to end products that are radically different in kind.

To be suitable for use in the present invention the ketone-aldehyde condensation product must be "reactive" in the sense that it can engage in a variety of chemical reactions and, in a more specific sense, that it be possessed of a specialized type of reactivity, to wit, that due to the presence of a peculiar functionally reactive atomic grouping of unknown structure which permits these compounds to undergo very ready condensation in the presence of a strong alkali. When a strong alkali, such as sodium hydroxide solution, is added to a ketone-aldehyde condensation product of the type under discussion, the same will, either immediately or upon heating, undergo ready condensation, usually leading to the formation of high molecular weight complexes or materials of the "C" stage resinous type (which latter are insoluble, infusible and substantially thermorigid). This unique type of reactivity is most manifest in the ketone-aldehyde condensation products wherein the ketone is acetone or the aldehyde is formaldehyde. The maximum reactivity is displayed by appropriate acetone-formaldehyde condensation products.

To be suitable for use in the present invention, the ketone-aldehyde condensation product must be "fusible." By restricting the condensation products to the fusible type there are ruled out the many infusible ketone-aldehyde condensation products which are either inoperative in the present process or lead to formation of end products which are radically different in kind.

Unsaturation in the aldehyde or the ketone employed in the making of the ketone-aldehyde condensation products does not appear to materially affect the characteristics associated with the potentially reactive products of the present invention.

As regards the physical state of the usable ketone-aldehyde condensation products it has been found that materials in the fluid, semifluid or the solid state are equally effective. For reasons of convenience, however, it is desirable to utilize the liquid condensation products or, alternatively, in the instance of the solid or near solid condensation products it is preferable to first thin them down with an appropriate solvent so as to procure a readily pourable liquid. Fluid products are desirable because of the ease with which they may be blended with the phenol-aldehyde condensation products for purposes of reaction, to yield the unique, distinctive and wholly unexpected compositions of the present invention.

Upon the basis of the above factual data the ketone-aldehyde condensation products suitable for use in the present invention may be defined in terms of their derivation and chemical and physical properties as follows:

"Ketone-aldehyde condensation products selected from the class consisting of the fusible, soluble, substantially non-resinous, substantially non-volatile and reactive condensation products produced by reacting together a ketone having the general formula $CH_3$—CO—R', wherein R' represents an aliphatic radical having from one to four carbon atoms, and an aldehyde having the general formula R''—CHO, wherein R'' represents a member selected from the group consisting of hydrogen and aliphatic radicals having from one to four carbon atoms."

All ketone-aldehyde condensation products that fall within the framework of the above definition may be used in accordance with the present invention to yield the new, novel and unexpected potentially reactive compositions of the present invention. All ketone-aldehyde condensation products that fall outside of the framework of the above definition are unsuited for use in the present invention either because they are inoperative or because they lead to the production of products radically different in kind from those of the present invention.

Ketone-aldehyde condensation products suitable for use in the present invention are best prepared by reacting a ketone with an aldehyde (both as above defined) in the presence of an appropriate catalyst. It is not my intention to here set forth any detailed procedure as to the method of making ketone-aldehyde condensation products of the type indicated, but reference may be made to U. S. Patent No. 2,191,802 as setting forth the preparation of one type of ketone-aldehyde condensation product preeminently suited for use in the present invention. The essence of the method there disclosed resides in the fact that the reaction between the ketone and the aldehyde is carried out in two separate and distinct stages, the reagents being first reacted in the presence of alkalis under controlled reaction conditions to produce a homogeneous and fusible intermediate product, after which an acid catalyst is added, said intermediate product being further reacted under acid conditions. Of the various condensation products therein described, the material referred to as "standard AFR" is ideally suited for use in the present invention. In connection with the "standard AFR," it is interesting to note that in spite of its "resinous" appearance, it has been found that this product is essentially non-resinous in character, is possessed of a low molecular weight, can be distilled in a molecular still and can readily be acetylated to an acetate which is readily distillable and crystallizable.

I have thus far discussed the nature only of the suitable ketone-aldehyde condensation products. Of equal importance is the nature of the phenol-aldehyde condensation products that are used in conjunction with the above identified ketone-aldehyde condensation products to produce the potentially reactive compositions of the present invention.

For purposes of study and utility it is customary to divide phenol-aldehyde condensation products into two categories. The one class comprises the phenol-aldehyde condensation products usually referred to as "resins of the permanently fusible" or "Novolak" type. For reasons of convenience I shall hereafter refer to resins of this class as "novolaks." Characteristic of novolaks is the fact that upon prolonged standing at ordinary temperature or under the influence of reasonable heat they will not become converted to the infusible, insoluble and thermo-rigid state. Novolaks are usually prepared by reacting a phenol with an aldehyde in the proportion of one mole of phenol to one or slightly less than one mole of aldehyde, generally in the presence of a catalyst. They cannot of themselves be converted to the infusible, insoluble and thermo-rigid state. However, through the agency of appropriate cross-linking agents, commonly referred to as curing or hardening agents, as typified by material containing reactive methylene groups (e. g., hexamethylenetetramine) it is possible to procure potentially reactive compositions which, when subjected to a proper time-temperature schedule, are convertible to the infusible, insoluble, and thermo-rigid so-called "C" state.

Phenol-aldehyde condensation products of the novolak class are essentially unsuited for use in the pursuit of the present invention. Novolak resins are not possessed of the necessary functional attributes that are directly concerned in the production of the potentially reactive compositions of the present invention.

Phenol-aldehyde condensation products of the non-novolak type are commonly referred to as being of the "potentially reactive type" and that terminology will be used in this specification. The chief attribute of the phenol-aldehyde condensation products of the potentially reactive type is the fact that upon long standing at ordinary temperatures, or rapidly under the influence of heat, they will undergo reaction and become converted to the infusible, insoluble and thermo-rigid state (the so-called "C" stage). It is to be observed that resins of the potentially reactive type, in contra-distinction to resins of the novolak type, are convertible to the "C" stage by merely heating them, without the necessity of having to add a co-reactant or cross-linking agent. Potentially reactive resins are frequently referred to as "single stage resins." Potentially reactive phenolic resins are prepared by reacting a phenol with a quantity of aldehyde which, if the reaction be carried to completion, is capable of yielding the ultimate infusible, insoluble and thermo-rigid form of resin. This generally calls for a quantity of aldehyde that is in substantial molar excess of the quantity of phenol employed. The type of catalyst used depends upon the nature of the reactants employd. In the instance of phenol and formaldehyde, it is customary to utilize an alkaline catalyst, e. g., sodium hydroxide.

Only phenol-aldehyde condensation products of the potentially reactive type are suitable for use in the pursuit of the present invention. All other types of phenol-aldehyde condensation products are essentially unsuited.

The precise physical and chemical properties of a potentially reactive phenol-aldehyde condensation product depend upon the nature of the phenol, aldehyde and the catalyst employed, as well upon whether or not a diluent is used in carrying out the reaction. It is also influenced by the time-temperature schedule employed. The preferred phenols for the production of potentially reactive phenol-aldehyde condensation products suitable for use in the present invention are phenol, meta substituted phenols (such as meta-cresol), 3-5 substituted phenols (e. g., 1-3-5-xylenol), resorcinol and phoroglucinol. Although any one of several aldehydes may be utilized for the production of potentially reactive resins suitable for use in the pursuit of the present invention, I believe that formaldehyde and, in some instances, glyoxal are the preferred aldehydes. Paraformaldehyde may be used in lieu of formaldehyde. Purified non-resinous phenol-aldehyde condensation products such as phenol di- and tri-alcohol are preeminently suited for use in the present invention.

Potentially reactive phenol-aldehyde condensation products may be produced in either the solid or liquid state. The liquid compositions usually owe their fluidity to the presence of a fluid material or solvent (e. g., water, free phenol, alkaline aqueous solutions, alcohol, acetone, isopropanol, methanol, or aqueous solutions of the aforementioned alcohols). For the purposes of the present invention the potentially reactive phenol-aldehyde condensation product may be in either the liquid or solid state. For reasons of convenience it is desirable to utilize the condensation product in the form of a solution or as a liquid resin.

In my copending application, Ser. No. 30,733, previously referred to, it is disclosed that resinoid mixtures of the above specified ketone-aldehyde and potentially reactive phenol-aldehyde condensation products constitute an improved composition of matter possessing desirable properties and that in particular such mixtures will resinify much more quickly than either of their components standing alone to form insoluble and infusible thermoset compositions possessed of new and unusual properties. In addition, the cured products of the mixtures of the copending application exhibit great physical strength and water and chemical resistance, the strength being materially greater than the strength of the cured products of either of the components standing alone, and the water and chemical resistance being either equal to or superior to those of the cured products of the components of the mixture standing alone. It is pointed out in the aforesaid application that the cured product derived from said mixture apparently consists of three major constituents, one being cured phenol-aldehyde resinous condensate, another being a cured ketone-aldehyde condensation product, and the third and larger portion of the whole consisting of a cured product resulting from the reaction between ketone-aldehyde and potentially reactive phenol-aldehyde condensation products. In considering the present invention, it must be clearly kept in mind that the resinoid products of the copending application are merely mechanical mixtures of the ketone-aldehyde and potentially reactive phenol-aldehyde condensation products, and that no chemical combination between those two components takes place prior to the time that they are subjected to the curing step and carried through to form insoluble and infusible cured products.

The instant application deals with the discovery that if the potentially reactive mixtures of the afore-described invention are subjected to conditions of controlled resinification, short of the point of gelation, the resultant products are endowed with all the novel and distinctive attributes associated with the potentially reactive mixtures of the afore-described invention, with the important difference that all of the aforesaid attributes are now greatly accentuated. In general, the further the reaction is carried, short of the gel point, the better the product. Thus, while properly formulated potentially reactive mixtures of the prior invention can be made to cure about three times as fast as the component entities per se that entered into the mixture, the potentially reactive reaction products of the present invention may cure fully three times as fast again or about ten times as rapidly as the original component entities. Further, comparing the reaction products to their mixtures, it is found that the former yield more homogeneous products—a much larger proportion of the ultimate cured products consists of the inter-reaction products in the cured state rather than the separated components per se in a cured state. It has also been found that the reaction mixture yields products of increased mechanical strength and greater uniformity as compared to the cured products derived from the afore-described potentially reactive mixtures.

The manner in which these products are produced is relatively simple. The first step is to secure a homogeneous mixture of the two condensation products. The resultant mixture in effect constitutes a potentially reactive composition of the type disclosed in copending application, Serial No. 30,733 previously referred to. The mixture is then subjected to controlled resinification by subjecting the potentially reactive mixture to a predetermined time-temperature schedule.

For practical reasons, so that the reaction may be completed within a reasonable period of time via the use of conveniently obtainable temperatures, the use of an alkaline catalyst is preferable, but not necessary. As catalysts one may employ any compound or combination of compounds calculated to maintain the pH, during the processing, to within a desired predetermined range, preferably between 7 and 9. The use of a pH above 9 is permissible but the reaction becomes more erratic and difficult to control. The use of a pH below 7 is permissible but the reaction becomes unduly prolonged unless higher than usual temperatures are employed. The preferred catalysts are similar to those used to effect catalysis of the completed product for the purpose of curing the same, except that the strongly alkaline compounds of the polyvalent metals are not recommended here since they tend to cause premature gelling. Such cure catalysts are described in a subsequent portion of this specification. For most applications it is found that sodium hydroxide, which is both economical and readily available, can be used very advantageously.

The purpose of the processing is to effect a reaction between the ketone-aldehyde and the potentially reactive phenol-aldehyde condensation products. The speed of the reaction is influenced by (1) the nature of the condensation product employed; (2) the ratio of the reactants; (3) the relative concentration of the reactants (in virtually all practical systems some inert solvent or diluent is present); (4) the hydrogen ion concentration (this is largely governed by the amount and type of alkaline catalyst employed); and (5) the temperature at which the reaction is carried out (operation under pressure may be resorted to in instances where it is desired to operate at temperatures above the boiling points of the more volatile ingredients present). As already indicated, it is desirable to carry the reaction as far as possible though short of the gel point. If the rate of reaction is too rapid, then the reaction becomes too critical in the sense that it becomes too difficult to stop the reaction just short of the gel point. On the other hand, if the reaction rate is too slow, then obvious economic considerations intervene. From the standpoint of commercial operation, it has been found advantageous to carry out the reaction under conditions such that it can be carried out in between about one-half and about four hours.

For the purpose of moderating the reaction and enabling the operator to determine the end point without too much difficulty, it has been found desirable to carry out the reaction in the presence of a more or less inert diluent or solvent. A certain amount of solvent is usually contained in the original condensation products. Where this amount is substantial, it is unnecessary to add any additional diluent. In many instances, however, it will be found necessary to add an additional quantity of solvent so as to dilute the concentration to a desirable level. For this purpose it will be found that one or more of the compounds or mixtures thereof that have been previously listed as among the potential solvents for ketone-aldehyde condensation products may be employed for this purpose. It is generally desirable to use a volatile solvent which can readily be distilled off or which will evaporate when the finished product is put to use. Among the preferred solvents are methanol, ethanol, acetone, ethylene glycol, and its methyl and ethyl ethers. It is usually necessary to include a certain amount of water which functions in the role of coupling medium. No more solvent than necessary should be employed.

In a properly composed system all the ingredients entering into the reacting mass are usually in a state of mutual solution. Exceptions to this rule occur in the instance where substantially insoluble modifying agents, e. g., copper oxide, zinc oxide, etc. are included in the charge. It has been determined that satisfactory commercial operation may be achieved when the actual "solids" content of the reacting mass ranges between 50 and 80%. When the solids content exceeds 80%, the concentration of reactive components is rather high and difficulty is experienced in carrying out the reaction without premature gellation setting in. When the concentration of the reactive condensation products is less than 50% an unneeded large quantity of solvent is present and the reaction is usually unduly drawn out.

In the instance where the two condensation products to be reacted together are nominally more or less incompatible with one another, two alternatives are open, viz. (1) one may effect solution through the use of a coupling medium or solvent, or (2) one may produce a dispersion or emulsion by any one of several recognized methods. The new entity that comes into being as a result of the reaction between the two types of condensation products may or may not be compatible with one or both of its progenitors.

The reaction between the ketone-aldehyde and the potentially reactive phenol-aldehyde condensation products occurs at an appreciable rate at temperatures above about 120° F., and virtually all of the more useful and more reactive resinoids of the present invention are advantageously produced by operating within the temperature range of 140° F. and 230° F.

Where both the ketone-aldehyde and the phenol-aldehyde condensation products are of the relatively stable type and are capable of reacting with one another only under more drastic conditions, one may utilize temperatures as high as 350° F.

In instances where appreciable amounts of water or other volatile solvents are present, the presence of these materials endows the charge with a more or less fixed boiling or reflux temperature. At a given pressure, e. g., atmospheric, the boiling or reflux temperature of the reacting mass obviously sets the upper temperature limit. Because of this circumstance, it is possible through the choice of appropriate quantities of proper diluents, to automatically fix the upper temperature limit. It thus becomes feasible to merely heat the reacting charge to the reflux temperature (which usually changes but slightly during the course of the run) and to then maintain a gentle reflux throughout the reaction period, thereby maintaining the temperature at a predetermined point throughout the course of the reaction by utilizing an appropriate concentration of selected solvents in the charge. The use of a solvent for this purpose at the same time serves as a diluent that moderates the reaction and thus permits it to run a smoother course devoid of erratic and critical behavior.

The reaction should be continued just short of the gel point. Once one has established the time required to reach the gel point (for a charge of given composition in a given piece of apparatus), it is a relatively simple matter to stop the processing just short of that point. In order to provide some leeway and to avoid the possibility of a batch being carried too far (once the material has gelled it is virtually useless for the majority of commercial applications), it is recommended to stop the reaction short of the gel point by a reasonable period of time. If the gel point is reached in, say, three hours' time (during which time the composition is maintained at the reflux temperature), the reaction may be stopped after about two and one-half hours. In commercial practice it has been found advantageous to determine the gel time by carrying out a small run in the laboratory under controlled conditions.

Upon the basis of the above information the preferred procedure for the production of the resinoids of the present invention is as follows: Selected ketone-aldehyde and potentially reactive phenol-aldehyde condensation products are stirred together to produce a homogeneous mixture. Where necessary, there is added to the mixture a moderate quantity of an appropriate diluent such as ethyl alcohol, isopropyl alcohol, ethylene glycol or its mono-methyl ether. A small quantity of catalyst, such as a 4/normal aqueous sodium hydroxide solution, is slowly stirred in. The mixture is then heated to the reflux temperature. The mixture is refluxed for a period of time reasonably short of the predetermined gel point. When the reaction time is up, the reaction is stopped by cooling the reaction product. For most applications the reaction product is then diluted with an appropriate solvent. Not infrequently it is advantageous to add the solvent some time between the time when the reaction is stopped and when the temperature has dropped to that of the ambient surroundings. Plasticizers or other materials may be incorporated to modify or accentuate certain attributes.

The following examples are illustrative of the above disclosures:

Example I

To 56.9 pounds of a ketone-aldehyde condensation product ("standard AFR" as per U. S. Patent 2,191,802) there were added 30.5 pounds of a potentially reactive phenol-aldehyde condensation product (conveniently prepared by reacting 15.7 pounds of phenol with 26.85 pounds of 37½% aqueous formaldehyde in the presence of 700 mil of an 8/normal aqueous sodium hydroxide solution and concentrating to a net weight of 30.5 pounds). The above condensation products were stirred together until a homogeneous mixture resulted. As reaction moderator there were added 2520 mil of ethyl alcohol. After solution a catalyst (700 mil of 4/normal aqueous sodium hydroxide solution) was slowly introduced with continuous stirring. The charge was heated to the reflux temperature (temperature of reacting mass approximately 198° F.). A small test run in a laboratory (in glassware) indicated that the gel point at this temperature occurred in about an hour and a half. The reacting mass was maintained at the reflux temperature for a period of about one hour (i. e., one-half hour short of the gel point). The heat was then turned off and cooling water applied to bring the product down to room temperature. The reaction product was in the form of a thick, amber colored honey-like mass. It possessed a nominal shelf life at ordinary temperatures, but could be stored under refrigeration for prolonged periods of time. When appropriately catalyzed (e. g., via 4/normal NaOH) the product cured very rapidly at temperatures of 220° F. The rate of cure was approximately three times that of the same mixture prior to reaction, or, stated another way, the product cured in approximately one-tenth the time required for the curing of either of the original condensation products that entered into its making. The product was miscible with ethylene glycol in all proportions, but was only partially miscible with acetone, methanol, ethyl alcohol, isopropanol, or water. The product had a high tolerance for aqueous solvent blends, e. g., aqueous acetone.

Example II

A product identical with that of Example I was prepared. At the end of the reaction period, before cooling the product down to room temperature, a plasticizer was added (6.78 pounds of 2-ethyl-hexane-diol-1-3). The product of this example was outwardly very similar to that of Example I, but the presence of the plasticizer yielded an ultimate cured article which was appreciably less brittle and was possessed of a greater resiliency.

Example III

A product identical with that of Example II was first prepared. After the addition of the 2-ethyl-hexane-diol-1-3, the mass was cooled to approximately 150° F. Then, with continuous stirring, there were slowly added 34.9 pounds of aqueous acetone (one part by weight of acetone to three parts by weight of water) as a solvent. The resultant solution, while still warm, was strained through cloth to remove scale, etc.

The yield was approximately 134.5 pounds of a thin amber, honey-colored syrup. The product conformed to the following specifications: standard solids 49.5%; low temperature solids 63.3%; specific gravity 1.148 (25° C.); specific viscosity 200–400 centipoises; pH 7.6.

Example IV

Ketone-aldehyde and potentially reactive phenol-aldehyde condensation products, qualitatively and quantitatively similar to those of Example I, were stirred together. Then 2520 mil of the monomethyl ether of ethylene glycol were introduced. After stirring a few minutes 700 mil of a 4/normal solution of sodium hydroxide were slowly added. The mass was then heated and maintained at approximately 200° F. for a period of 1½ hours (approximately ½ hour short of the gel point). After the reacted mixture was cooled to about 165° F. there was added a solution comprising 8.75 pounds of the monomethyl ether of ethylene glycol and 8.75 pounds of ethylene glycol. The mixture was stirred to assure uniformity. The yield was approximately 110.5 pounds while the specifications were as follows: low temperature solids 83.5%; standard solids 60%; specific gravity 1.223 (25° C.); specific viscosity 8250 centipoises; pH 7.3. The product of this example was quite similar to that of above Example III from which it differed in that the more ready volatiles of the latter were replaced with less volatile compounds so as to adapt the composition to applications where lower orders of volatility are called for.

Example V

A potentially reactive composition identical with that of above Example IV was first prepared. To 100 parts by weight of the product of Example IV there were added 27.5 parts by weight of methanol and 1 part by weight of a suitable wetting agent. The resultant blend possessed the following specifications: low temperature solids 60%; standard solids 45%; specific gravity 1.108; specific viscosity 90 centipoises; pH 7.87

Example VI

To 56.9 pounds of a ketone-aldehyde condensation product ("standard AFR" as per U. S. Patent 2,191,802) there were added 32 pounds of a potentially reactive phenol-aldehyde condensation product (prepared by reacting 8 pounds phenol plus 8 pounds of meta cresol with 25 pounds of 37½% aqueous formaldehyde in the presence of an alkaline catalyst and concentrating to a net weight of 33 pounds). The above condensation products were stirred together until a homogeneous mixture resulted. Then 2½ litre of the monomethyl ether of ethylene glycol were added. After solution the catalyst (500 mil of 4/normal NaOH) was slowly introduced with continuous stirring. The charge was heated to the reflux and kept there for a period of one hour (about ½ hour short of the gel point). The reacted mass was then cooled to 180° F. and diluted with a mixture of ethylene glycol and its monoethyl ether. The resultant light amber colored product was possessed of a medium viscosity.

Example VII

To 60 pounds of a ketone-aldehyde condensation product (prepared by reacting acetone with about 4.5 moles of formaldehyde in the presence of potassium carbonate as catalyst and then concentrating by evaporating off the ready volatiles) there were added 35 parts by weight of a potentially reactive phenol-aldehyde condensation product (prepared by reacting 1 mol of phenol in the presence of 2 moles of butylaldehyde using sodium hydroxide as catalyst). The condensation products were stirred together until a homogeneous mixture resulted. The mixture was then heated to reflux and maintained there for a period of approximately two hours (about three-quarters of an hour short of the gel point). The resultant viscous material cured less rapidly than the products of the foregoing examples, but nevertheless cured two to three times as rapidly as the original mixture prior to reaction. The butyric odor associated with this product limits its utility.

Example VIII

One hundred pounds of an ethyl methyl ketone-formaldehyde condensation product (prepared after the manner outlined in U. S. Patent 2,191,802) were mixed with 30 pounds of a potentially reactive phenol-formaldehyde condensation product of the type used in Example I. A litre of anhydrous ethyl alcohol was added along with 250 mil of an 8/normal sodium hydroxide solution. After stirring until a homogeneous mixture resulted, the mass was heated to reflux and kept there for a period of approximately 3½ hours (about an hour short of the gel point). The resultant product was somewhat similar to that of Example I except in that it cured at a somewhat slower rate, possessed a lower tolerance for water but a higher tolerance for organic compounds containing hydrophylic groups.

Example IX

One hundred pounds of a ketone-aldehyde condensation product (prepared by reacting methyl isobutyl ketone with formaldehyde after the manner outlined in U. S. Patent 2,191,802) were mixed with 15 pounds of a potentially reactive phenol-formaldehyde condensation product (prepared by reacting 1 mol of phenol with 1.75 mols of aqueous formaldehyde in the presence of sodium hydroxide). Two pounds of sodium hydroxide dissolved in 6 pounds of water were then slowly introduced while the mass was being vigorously stirred. The material was heated to reflux and kept there for a period of about three hours. The resultant viscous product had a very low tolerance for water but was quite soluble in ethyl alcohol, ethyl methyl ketone and the monomethyl ether of ethylene glycol. While much slower curing than the products of the prior examples this material was well suited for use as a bonding agent in conjunction with appropriate fillers in applications where oven curing is feasible.

It is to be observed that in the pursuit of the present invention the ketone-aldehyde and the potentially reactive phenol-aldehyde condensation products are reacted together short of the gel point. If the reaction is carried to or beyond the point of gelation the resultant product is possessed of little intrinsic worth for the applications for which the compositions of the present invention are intended, since the resultant products would then become substantially infusible and insoluble. In marked contrast thereto, when the reaction is run short of the gel point, the resultant products are fusible and soluble. In view of the fact that the compositions of the present invention are potentially reactive, i. e., are heat-hardening in character in that they change from the soluble and fusible state to the insoluble and infusible solid state on heating, the products are appropriately termed "resinoids." The term "resinoids," as used throughout the present specification and claims, has reference to a soluble and fusible resinous entity which, upon the application of heat under appropriate conditions, becomes converted to the insoluble and infusible solid state.

The resinoids of the present invention range in consistency from water thin fluids to extremely viscous masses that will barely flow under their own weight. The consistency is largely controlled by the quantity and type of solvent that is present during the reaction or added thereafter. The resinoids are "soluble" in the sense that they will dissolve in one or more, or in combinations, of the solvents that have already been enumerated in connection with the solubility of the ketone-aldehyde condensation products usable in the present invention. Water cannot be employed as the sole solvent but it has been found that aqueous solutions of acetone, methanol, ethanol, or isopropanol or mixtures thereof often give excellent results. Where a less readily volatile solvent is required, materials such as ethylene glycol, diethylene glycol or the monomethyl or monoethyl ethers of ethylene glycol have proven very satisfactory.

The products of the present invention may be variously modified through the inclusion of other materials. Depending upon the circumstances, the "modifying agents" may be incorporated either during the processing operation or they may be added to the product after reaction.

At the time of curing there is added to the potentially reactive compositions of the present invention a strongly alkaline catalyst, the amount and type of which depends upon the nature of the application. The stronger the alkaline material, the more potent its catalytic properties. The greater the quantity of catalyst that is added, the faster the cure. The alkaline catalysts may belong to any one of several classes. The hydroxides of cesium, rubidium, potassium, sodium and lithium, preferably in the form of aqueous solutions, are admirably suited to this purpose. The hydroxides of barium, strontium, and calcium are not particularly recommended owing to peculiar side reactions that occur when these materials are utilized as sole catalyst. Strongly alkaline water-soluble compounds of the alkali metals, such as alkali metal zincate, plumbate, aluminate, etc. are excellent catalysts, although in most instances, in order to prevent premature gelling, it is advisable to mix such alkali metal compounds with alkali metal hydroxide. The stronger organic amines, particularly polyamines of the type of ethylenediamine, diethylenetriamine, triethylenetetramine, and tetraethylene pentamine are very suitable as catalysts, though they are not as potent as the alkali metal hydroxides and suffer from the disadvantage in that, owing to their poly functional character, they have a tendency toward premature gelling. The organic ammonium bases such as tetraethanol ammonium hydroxide and benzyl trimethyl ammonium hydroxide, function as potent catalysts and have the advantage, for some applications, after they have been heated during the process of cure they degenerate into milder alkaline materials. For purposes of convenience we have come to look upon an aqueous 4/normal sodium hydroxide solution as the "standard catalyst."

The resinoids of the present invention are usually in a more or less fluid state. It is a peculiar fact that when an attempt is made to dehydrate the products of the present invention they invariably pass into a jell or semi-rubbery state, which circumstance precludes the procurement of these products in the soluble, fusible and grindably hard solid state. Compositions which contain a high percentage of phenol-aldehyde condensation products may be processed to the grindably hard solid state, but, unfortunately, such compositions, owing to the low percentage of ketone-aldehyde condensation product which they contain, do not possess in any great measure the unique and distinctive attributes of the novel products of the present invention.

The precise physical and chemical attributes possessed by any of the resinoids of the present invention are naturally dependent upon the nature of the condensation products reacted together or, going back further to the source, they are dependent upon the nature of the ketone, the phenol and the aldehyde that enter into the making of said condensation products. It has been observed that the unexpected distinctive attributes associated with the products of the present invention are manifested to a maximum degree (1) when acetone is a component of the ketone-aldehyde condensation product; (2) when formaldehyde is a component of the ketone-aldehyde condensation product; (3) when phenol, metacresol, 3,5-xylenol or resorcinol is a component of the phenol-aldehyde condensation product; and (4) when formaldehyde or glyoxal is a component of the phenol-aldehyde condensation product. It appears that for most purposes the best results are procured when appropriately prepared acetone-formaldehyde condensation products are mixed with potentially reactive phenol-formaldehyde condensation products. The physical and chemical attributes, including the shelf life, which may range between three months and two years, are naturally greatly influenced by the extent to which the reaction between the condensation products has been carried. As already indicated, the closer the reaction is carried to the gel point, the better the products from the standpoint of speediness of cure, etc., though at a corresponding sacrifice in the shelf life.

For reasons not fully understood it has been observed that products made out of the acetone-formaldehyde condensation products produced after the manner disclosed in U. S. Patent 2,191,802 appear to be superior to and different from those derived from acetone-formaldehyde condensation products produced merely via alkali catalysis without subsequent reaction in an acid environment.

For the purposes of the present invention the ratio of the phenol-aldehyde to the ketone-aldehyde condensation products that are reacted together may cover a wide range. I have found that in order that the compositions, after reaction, manifest to a substantial degree the unexpected, novel and highly desirable functional attributes with which the resinoids of the present invention are endowed it is necessary that the phenol-aldehyde condensation product (in terms of solids content on a weight basis) be present to the extent of not less than 5% upon the combined weights of the two condensation products. The unique and distinctive attributes associated with the products of the present invention are manifested in the largest degree when the phenol-aldehyde condensation product is present to the extent of between 10 and 30% upon the combined weights of the two condensation products.

When the phenol-aldehyde condensation product is present to an extent in excess of 50% upon the combined weights of the two condensation products, then the attributes of the ultimate product partake more and more of those associated with an ordinary modified phenol-aldehyde condensation product. When the concentration of the phenol-aldehyde condensation product exceeds 90% upon the combined weights of the two condensation products, then the distinctive attributes manifested by the resinoids of the present invention are no longer readily discernible. The fact that the maximum showing of the distinctive attributes of the present products is manifested when the ketone-aldehyde condensation product is present to the extent or between 50 and 95% (best between 70 and 90) upon the combined weights of the two condensation products indicates clearly that the ketone-aldehyde condensation product should comprise the major portion of the whole.

When the resinoids of the present invention are permitted to cure in the form of films or thin sections exposed to the atmosphere and subjected to a controlled time-temperature curing schedule, the resultant products are dense, clear and homogeneous. When the resinoids of the present invention are subjected to curing conditions in thick cross sections, under circumstances where the opportunity for the escape of ready volatiles is small, or when cured in a closed space, then the results are quite different and depend upon a variety of factors. As the cure progresses, the solvents or other inert fluids that may be present and which are not compatible with the ultimate cured products separate out as a distinct phase and tend to migrate away from the center, giving the effect of the resins shrinking toward the center and a substantial portion of the migratible fluid exuding out upon the surface (sweating out). Inasmuch as the resinoid products of the present invention generally contain a substantial quantity of inert fluids of one type or another, this phenomenon is quite general. Under appropriate conditions of catalysis and a carefully controlled time-temperature schedule, it is possible so to cure masses of the potential reactive compositions of the present invention that they will yield hard, strong, dense, cured products, but the cured product will normally be in the form of small, more or less broken up, fragments, owing to the circumstance that as the cure progresses the shrinkage is so great that the resultant stresses and strains within the material caused the same to split and fracture. Under appropriate conditions of catalysis and via the use of a very slow time-temperature schedule, it is possible to cure the resinoids of the present invention so that the mass during the process of cure does not break up into small pieces, but under these conditions the resultant product will be extremely microporous in character. For certain applications such microporosity is not objectionable and may indeed be a highly sought after attribute.

The resinoids of the present invention may be variously modified so as to suit them to specific applications. For example, for some purposes there is desired a product which, in the ultimate cured form, is possessed of a low resistance toward water, i. e., is water disintegratible. It has been discovered that such compositions are readily procured when there is added to the potentially reactive products a water-soluble material such as ethyleneglycol, diethylene-glycol, glycerine, triethanolamine, sugar, etc.

For some applications it may be desirable to extend the resinoids of the present invention. This can readily be accomplished through the addition of materials such as water-soluble compounds of lignin (e. g., lignin-sulfonic acid which is produced on a large scale as a by-product in the manufacture of kraft paper). Up to 50% of such lignin-containing material may be added to the more water-soluble compositions of the present invention to yield ultimate cured articles of excellent strength.

The resinoids of the present invention constitute distinct chemical entities having different properties, both chemical and physical, from those substances not coming within the scope of this application. Differentiation has already been made between the substances of the present invention and those of my application, Serial No. 30,733. It should also be noted that the products of the present invention differ from those resulting from the reaction between a phenol and a ketone aldehyde condensation product (as in United States Letters Patent No. 2,191,802) and the reaction between ketone-aldehyde condensation products, a phenol, an aldehyde and a catalyst.

As many apparently widely different embodiments of this invention may be made without departing from the spirit thereof, it is to be understood that the invention is not limited to the specific illustrative examples contained in this specification, but rather that it encompasses the generalized procedures as broadly set forth, inasmuch as the details and modifications are rather self evident and amendable to orthodox chemical engineering practices.

I claim:

1. Resinoids comprising the reaction product, carried to a point short of gelation, between a ketone-aldehyde and a potentially reactive phenol-aldehyde condensation product, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting a ketone having the general formula $CH_3$—CO—R', wherein R' represents an unsubstituted aliphatic radical having from one to four carbon atoms, with an aldehyde having the general formula R''—CHO, wherein R'' represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

2. Resinoids comprising the reaction product, carried to a point short of gelation, between a ketone-aldehyde and a potentially reactive phenol-aldehyde condensation product, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

3. Resinoids comprising the reaction product, carried to a point short of gelation, between a ketone-aldehyde and a potentially reactive phenol-formaldehyde condensation product, said ketone-aldehyde condensation product being used in the proportion of between 50 and 95% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting a ketone having the general formula $CH_3—CO—R'$, wherein $R'$ represents an unsubstituted aliphatic radical having from one to four carbon atoms, with an aldehyde having the general formula $R''—CHO$, wherein $R''$ represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

4. Resinoids comprising the reaction product, carried to a point short of gelation, between a ketone-aldehyde and a potentially reactive phenol-formaldehyde condensation product, said ketone-aldehyde condensation product being used in the proportion of between 50 and 95% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

5. Resinoids comprising the reaction product, carried to a point short of gelation, between a ketone-aldehyde and a potentially reactive phenol-aldehyde condensation product, said ketone-aldehyde condensation product being used in the proportion of between 70 and 90% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting a ketone having the general formula $CH_3—CO—R'$, wherein $R'$ represents an unsubstituted aliphatic radical having from one to four carbon atoms, with an aldehyde having the general formula $R''—CHO$, wherein $R''$ represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

6. Resinoids comprising the reaction product, carried to a point short of gelation, between a ketone-aldehyde and a potentially reactive phenol-aldehyde condensation product, said ketone-aldehyde condensation product being used in the proportion of between 70 and 90% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

7. Resinoids comprising the reaction product, carried to a point short of gelation, between a ketone-aldehyde and a potentially reactive phenol-formaldehyde condensation product, said ketone-aldehyde condensation product being used in the proportion of between 70 and 90% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting a ketone having the general formula $CH_3—CO—R'$, wherein $R'$ represents an unsubstituted aliphatic radical having from one to four carbon atoms, with an aldehyde having the general formula $R''—CHO$, wherein $R''$ represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

8. Resinoids comprising the reaction product, carried to a point short of gelation, between a ketone-aldehyde and a potentially reactive phenol-formaldehyde condensation product, said ketone-aldehyde condensation product being used in the proportion of between 70 and 90% on the combined weights of said condensation products and selected from the class consisting of fusible, soluble, low molecular weight substantially nonvolatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

9. The process of producing resinoids which entails reacting a ketone aldehyde condensation product with a potentially reactive phenol-aldehyde condensation product short of the gel point, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting a ketone having the general formula $CH_3-CO-R'$, wherein $R'$ represents an unsubstituted aliphatic radical having from one to four carbon atoms, with an aldehyde having the general formula $R''-CHO$, wherein $R''$ represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

10. The process of producing resinoids which entails reacting a ketone-aldehyde condensation product with a potentially reactive phenol-aldehyde condensation product short of the gel point, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

11. The process of producing resinoids which entails reacting a ketone-aldehyde condensation product with a potentially reactive phenol-formaldehyde condensation product short of the gel point, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting a ketone having the general formula $CH_3-CO-R'$, wherein $R'$ represents an unsubstituted aliphatic radical having from one to four carbon atoms, with an aldehyde having the general formula $R''-CHO$, wherein $R''$ represents a member selected from the group consisting of hydrogen and unsubstituted aliphatic radicals having from one to four carbon atoms, said reaction between said ketone and said aldehyde being carried out in the presence of an alkaline catalyst until substantially all the aldehyde is consumed, an acidic catalyst being then added to effect further reaction while maintaining acid conditions.

12. The process of producing resinoids which entails reacting a ketone-aldehyde condensation product with a potentially reactive phenol-formaldehyde condensation product short of the gel point, said ketone-aldehyde condensation product being used in the proportion of between 50 and 95% on the combined weights of said condensation products and selected from the class consisting of fusible, soluble, low molecular weight substantially non-volatile condensation products capable of yielding distillable and crystallizable acetylation products capable of condensation in the presence of sodium hydroxide to readily yield a high molecular weight insoluble and infusible material and produced by reacting acetone with formaldehyde, said reaction between said acetone and said formaldehyde being carried out in the presence of an alkaline catalyst until substantially all the formaldehyde is consumed, an acidic catalyst being then added to effect further reaction while maintaining acid conditions.

GEORGE KARL VOGELSANG.

REFERENCES CITED

The following references are of record in the file of this patent:

UNITED STATES PATENTS

| Number | Name | Date |
|---|---|---|
| 1,514,508 | Ellis | Nov. 4, 1924 |
| 2,191,802 | Novotny et al. | Feb. 27, 1940 |
| 2,206,906 | Loos | July 9, 1940 |
| 2,426,128 | Trowell | Aug. 19, 1947 |
| 2,545,559 | Schrimpe | Mar. 20, 1951 |

OTHER REFERENCES

Kropa: "Thermosetting Vinyl Polymers," Trans. of the Electrochemical Society, pages 247, 252–257, vol. 90 (1947).